United States Patent Office 3,174,992
Patented Mar. 23, 1965

3,174,992
METHOD FOR MAKING AMINONITRILES
Philip G. McCracken, Mobile, Ala., assignor to The Dow Chemical Company, Midland, Mich., a corporation of Delaware
No Drawing. Filed May 21, 1962, Ser. No. 196,447
4 Claims. (Cl. 260—465.5)

This invention relates to the preparation of amino aliphatic nitriles. It relates particularly to the ammoniation of beta-hydroxy lower alkyl nitriles to make the corresponding amino compounds.

The liquid phase ammoniation and amination of alpha-hydroxy alkyl nitriles is known. The hydroxyl group in these compounds is rendered very reactive by the relative position in the molecule of the activating nitrile function and the reaction proceeds at moderate temperatures to give good yields of the amino compound, no catalyst being necessary. Such a process is described by Gluud et al., U.S. 2,085,679. However, in alkyl nitriles having a more remotely substituted hydroxyl group, this group is then much less reactive, the nitrile group having little or no activating effect, and the reaction with ammonia is slow and incomplete. Raising the reaction temperature increases the conversion somewhat, but side reactions are also increased and practical yields of the desired product cannot be obtained. The use of a metallic hydrogenation catalyst to promote the liquid phase reaction of ammonia with a beta-alkoxypropionitrile is described in German Patent 1,003,740, issued in 1957 to Badische Anilin & Soda-Fabrik. From this reaction there is obtained a mixture containing a considerable proportion of the secondary amine and the yield of primary amine is only about 60 percent.

On the basis of the above prior art, therefore, the use of a hydrogenation catalyst in the ammoniation of a beta-hydroxyaliphatic nitrile such as ethylene cyanohydrin would presumably promote the reaction in a similar manner and one would expect to get a reaction product containing even larger proportions of secondary amine and other by-products than is obtained from the relatively less active beta-alkoxy compound.

Surprisingly, such is not the case. To the contrary, it has been found that the liquid phase reaction of ammonia with beta-hydroxy lower alkyl nitriles such as ethylene cyanohydrin can be carried out in the presence of a hydrogenation catalyst to obtain nearly quantitative yields of the desired 3-aminopropionitrile from essentially complete conversion of the cyanohydrin. The reaction is run at moderately high temperatures using a substantial excess of essentially anhydrous ammonia under superatmospheric pressure, ordinarily the autogenous pressure of the system, and in the presence of a finely divided hydrogenation catalyst prepared from one of the lower members of Group VIII of the periodic table.

Temperatures from about 50° C. to about 200° C. are suitable and 90–150° C. is preferred. Since the critical temperature of ammonia is within this range, ammonia may be present in the reaction mainly as a liquid or as gaseous ammonia except for that which is dissolved in the reaction mixture, depending upon whether the temperature is below or above about 133° C.

The proportion of ammonia to be used is from about three to about 50 moles per mole of ethylene cyanohydrin. Preferably about 7–30 moles of ammonia are employed.

Conventional hydrogenation catalysts of finely divided nickel, cobalt, or rhodium are operable in the process and these may be used as the finely divided metal itself, for example, Raney nickel or a pelleted metal catalyst, or as the metal on a suitable support such as kieselguhr or alumina. Nickel catalysts are preferred. The catalyst may be used in widely varying amounts depending upon its nature and activity, so long as enough is present to exert a substantial catalytic effect on the reaction. Amounts of 0.01 percent to 10 percent by weight of metal based on the total weight of reactants are suitable and larger quantities may be used.

Although the autogenous pressure of the system is usually most convenient and is ordinarily used, higher pressures obtained by pressuring with an inert gas such as nitrogen may be employed in the process if desired.

An inert solvent may be employed in the reaction mixture if desired. Suitable solvents unreactive in the process include aliphatic and aromatic hydrocarbons such as hexane, cyclohexane, benzene, and toluene and ethers such as dibutyl ether and tetrahydrofuran. Water is preferably substantially absent in the reaction mixture although small amounts such as are involved in using wet Raney nickel or cobalt catalysts are not objectionable.

The reaction is best carried out in pressure vessels of conventional design for this type of reaction, for example, a bomb or autoclave with temperature controlling means and agitated by a rocking or rolling mechanism or a stirred pressure kettle may be used. After completion of the reaction, the product may be separated from the reaction mixture by conventional means. Usually this is accomplished by distillation after venting to remove excess ammonia and filtration to remove the catalyst. Where the product is to serve as an intermediate for making another compound, the reaction mixture may be used as such, with or without further treatment.

Examples 1 and 2 illustrate the results obtained when no catalyst is used in the reaction.

*Example 1*

An autoclave of 300 ml. capacity was charged with 0.353 g. mole of ethylene cyanohydrin and 5.54 g. moles of ammonia. This mixture was heated in the closed vessel to 186° C. in 30 minutes and agitated at this temperature under its autogenous pressure for 37 minutes. The reactor was then cooled, the excess ammonia vented, and the contents distilled. The reaction mixture was found to contain 0.231 g. mole unreacted ethylene cyanohydrin and 0.0372 g. mole of 3-aminopropionitrile, representing a 30.5 percent yield based on the converted cyanohydrin.

*Example 2*

In the reactor of Example 1, 0.353 g. mole of ethylene cyanohydrin and 4.18 g. moles of ammonia were combined and heated under the autogenous pressure of the system at 162° C. for 37 minutes. The reaction mixture was found to contain 0.304 g. mole of unreacted ethylene cyanohydrin and 0.0376 g. mole of 3-aminopropionitrile, a yield of 76.7 percent based on the 13.9 percent conversion of the cyanohydrin.

Examples 3–6 illustrate the operation of the catalytic process under preferred conditions.

*Example 3*

A mixture of 0.352 g. mole of ethylene cyanohydrin, 3.0 g. moles of ammonia, and 10 g. of wet Raney nickel catalyst was heated in a 300 ml. autoclave to 100° C. and maintained at this temperature under the pressure of the system for one hour. The reaction mixture was then cooled, excess ammonia was vented, and the liquid product was found to contain 0.114 g. mole of ethylene cyanohydrin and 0.188 g. mole of 3-aminopropionitrile, a yield of 79.0 percent based on 67.6 percent conversion of the cyanohydrin.

*Example 4*

A mixture containing 0.353 g. mole of ethylene cyanohydrin, 3.94 g. moles of ammonia, and 10 g. of a commerical pelleted cobalt hydrogenation catalyst was heated in the reactor previously used to 100° C. in 45 minutes and held at an average temperature of 103° C. for 37 minutes. The catalyst had previously been reduced with hydrogen for four hours at 400° C. A 95 percent yield of 3-aminopropionitrile was obtained, based on 22.4 percent conversion.

*Example 5*

A 1410 ml. autoclave was charged with 2.128 g. moles of ethylene cyanohydrin, 28.9 g. moles of ammonia and 60 g. of a 60 percent nickel on kieselguhr hydrogenation catalyst, 64 percent reduced and having a surface area of approximately 150 square meters per gram. The reaction mixture was heated under autogenous pressure to a maximum temperature of 128° C. and held for 1½ hours at about 90–95° C. and for an additional 45 minutes at about 120–128° C. The liquid reaction product contained 1.948 g. moles of 3-aminopropionitrile and 0.0973 g. mole of ethylene cyanohydrin, representing a yield of 96.0 percent based on 95.4 percent conversion.

*Example 6*

The reactor of Example 1 was charged with 0.353 g. moles of ethylene cyanohydrin, 3.29 g. moles of ammonia, and 10 g. of a commercial 0.5 percent rhodium on alumina hydrogenation catalyst. This mixture was heated to 104° C. in 30 minutes, maintained at this temperature for 37 minutes, then cooled and vented. A 76.3 percent yield of 3-aminopropionitrile was obtained based on a 76.5 percent conversion of cyanohydrin.

The above examples are limited to the reaction of ammonia with ethylene cyanohydrin, but the process is also operable with other similar beta-hydroxy lower alkyl nitriles. For example, when ammonia is reacted under the above-described conditions with compounds such as 3-hydroxy-2-methylpropionitrile, 3 - hydroxybutyronitrile, 3-hydroxy-2,3-dimethylbutyronitrile, or 3-hydroxyvaleronitrile, the corresponding amino compounds are produced in yields comparable to those shown in the foregoing examples.

I claim:
1. A process for making a beta-amino lower alkyl nitrile which comprises reacting by contacting one mole of a beta-hydroxy lower alkyl nitrile in the liquid phase with about 3 to about 50 moles of ammonia at about 50° C. to about 200° C., under superatmospheric pressure and in the presence of an effective amount of a metal hydrogenation catalyst, said metal being selected from the group consisting of nickel, cobalt, and rhodium.

2. A process for making 3-aminopropionitrile which comprises reacting by contacting one mole of ethylene cyanohydrin in the liquid phase with about 3 to about 50 moles of ammonia at about 50° C. to about 200° C. and under superatmospheric pressure and in the presence of an effective amount of a metal hydrogenation catalyst, said metal being selected from the group consisting of nickel, cobalt and rhodium.

3. The process of claim 2 wherein the temperature is 90–150° C.

4. The process of claim 2 wherein the catalyst is a nickel hydrogenation catalyst.

References Cited by the Examiner

FOREIGN PATENTS 436,692    9/34    Great Britain.

OTHER REFERENCES

Badische Anilin, 1,003,740, German application, printed Mar. 1, 1957 (Kl. 12q 6/01), 1 page spec.

CHARLES B. PARKER, *Primary Examiner.*